US012724873B2

(12) United States Patent
Chandra et al.

(10) Patent No.: US 12,724,873 B2
(45) Date of Patent: Sep. 1, 2026

(54) TRUSTED EXECUTION ENVIRONMENT FOR DATA SHARING

(71) Applicant: Capital One Services, LLC, McLean, VA (US)

(72) Inventors: Niharendu Chandra, Glen Allen, VA (US); Anoop Gupta, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 525 days.

(21) Appl. No.: 18/335,786

(22) Filed: Jun. 15, 2023

(65) Prior Publication Data

US 2024/0419781 A1 Dec. 19, 2024

(51) Int. Cl.
*G06F 21/53* (2013.01)

(52) U.S. Cl.
CPC .................................... *G06F 21/53* (2013.01)

(58) Field of Classification Search
CPC ............................ G06F 21/53; G06F 21/6245
See application file for complete search history.

(56) References Cited

U.S. PATENT DOCUMENTS

2015/0356317 A1* 12/2015 Ukil .................... G06F 21/6245 726/28
2020/0233968 A1* 7/2020 Sun ....................... G06F 21/554
2022/0121776 A1* 4/2022 Johnston ............... G06F 21/554

* cited by examiner

*Primary Examiner* — Trong H Nguyen
(74) *Attorney, Agent, or Firm* — Harrity & Harrity, LLP

(57) ABSTRACT

In some implementations, a device may obtain an indication of one or more permissions associated with a dataset shared by a data provider via a first execution environment. The device may obtain an indication of one or more data processing applications associated with respective intents, wherein the one or more data processing applications are executable via a second execution environment, and wherein the respective intents indicate an intended use of data in association with the one or more data processing applications. The device may detect a data usage violation associated with a data processing application, from the one or more data processing applications, that has accessed and processed data from the dataset in the second execution environment, based on an intent associated with the data processing application not being permitted by the one or more permissions. The device may perform an action based on detecting the data usage violation.

18 Claims, 7 Drawing Sheets

TRUSTED EXECUTION ENVIRONMENT FOR DATA SHARING

BACKGROUND

"Data sharing" refers to a process of exchanging or providing access to data between different entities or systems. The ability to share data efficiently and securely enables collaboration, decision-making, and/or innovation, among other examples, in various domains. However, data sharing may present risks of disclosure of sensitive information and/or use of data in an unauthorized manner. Therefore, data sharing frameworks may be associated with technical safeguards and adherence to privacy regulations.

SUMMARY

In some implementations, a system for trusted execution environments for data sharing includes a first execution environment associated with a data provider; a second execution environment associated with a data consumer; and a core execution environment associated with managing data sharing between the data provider and the data consumer, wherein the core execution environment includes one or more memories; and one or more processors, communicatively coupled to the one or more memories, configured to: obtain, via the first execution environment, an indication of one or more permissions associated with a dataset shared by the data provider via the first execution environment, wherein the one or more permissions indicate a purpose for which the dataset is shared; obtain, via the second execution environment, an indication of one or more data processing applications associated with respective intents, wherein the one or more data processing applications are executable via the second execution environment, and wherein the respective intents indicate an intended use of data via the one or more data processing applications; detect that a data processing application, from the one or more data processing applications, has accessed and processed data from the dataset in the second execution environment; compare the one or more permissions to an intent, from the respective intents, associated with the data processing application; and perform an action if the intent is not permitted by the one or more permissions.

In some implementations, a method for trusted execution environments for data sharing includes obtaining, by a device associated with a core execution environment, an indication of one or more permissions associated with a dataset shared by a data provider via a first execution environment, wherein the one or more permissions indicate a purpose for which the data is shared, and wherein the first execution environment is associated with data sharing by the data provider; obtaining, by the device, an indication of one or more data processing applications associated with respective intents, wherein the one or more data processing applications are associated with a data consumer, wherein the one or more data processing applications are executable via a second execution environment that is associated with the data consumer, and wherein the respective intents indicate an intended use of data in association with the one or more data processing applications; detecting, by the device, a data usage violation associated with a data processing application, from the one or more data processing applications, that has accessed and processed data from the dataset in the second execution environment, wherein the data usage violation is based on an intent, from the respective intents, associated with the data processing application not being permitted by the one or more permissions; and performing, by the device, an action based on detecting the data usage violation.

In some implementations, a non-transitory computer-readable medium storing a set of instructions includes one or more instructions that, when executed by one or more processors of a first device, cause the first device to: register, with a second device associated with a core execution environment, one or more data processing applications that are executable via a first execution environment that is associated with the first device, wherein registering the one or more data processing applications includes indicating intended uses associated with respective data processing applications from the one or more data processing applications; obtain, via a second execution environment, data associated with a data provider, wherein the second execution environment is associated with the data provider; execute, via the first execution environment, a data processing application, from the one or more data processing applications, to process the data; and transmit, to the second device associated with the core execution environment, an indication of data usage based on executing the data processing application, wherein the indication of the data usage includes an indication of the data and the data processing application.

DETAILED DESCRIPTION

Figure 1A:
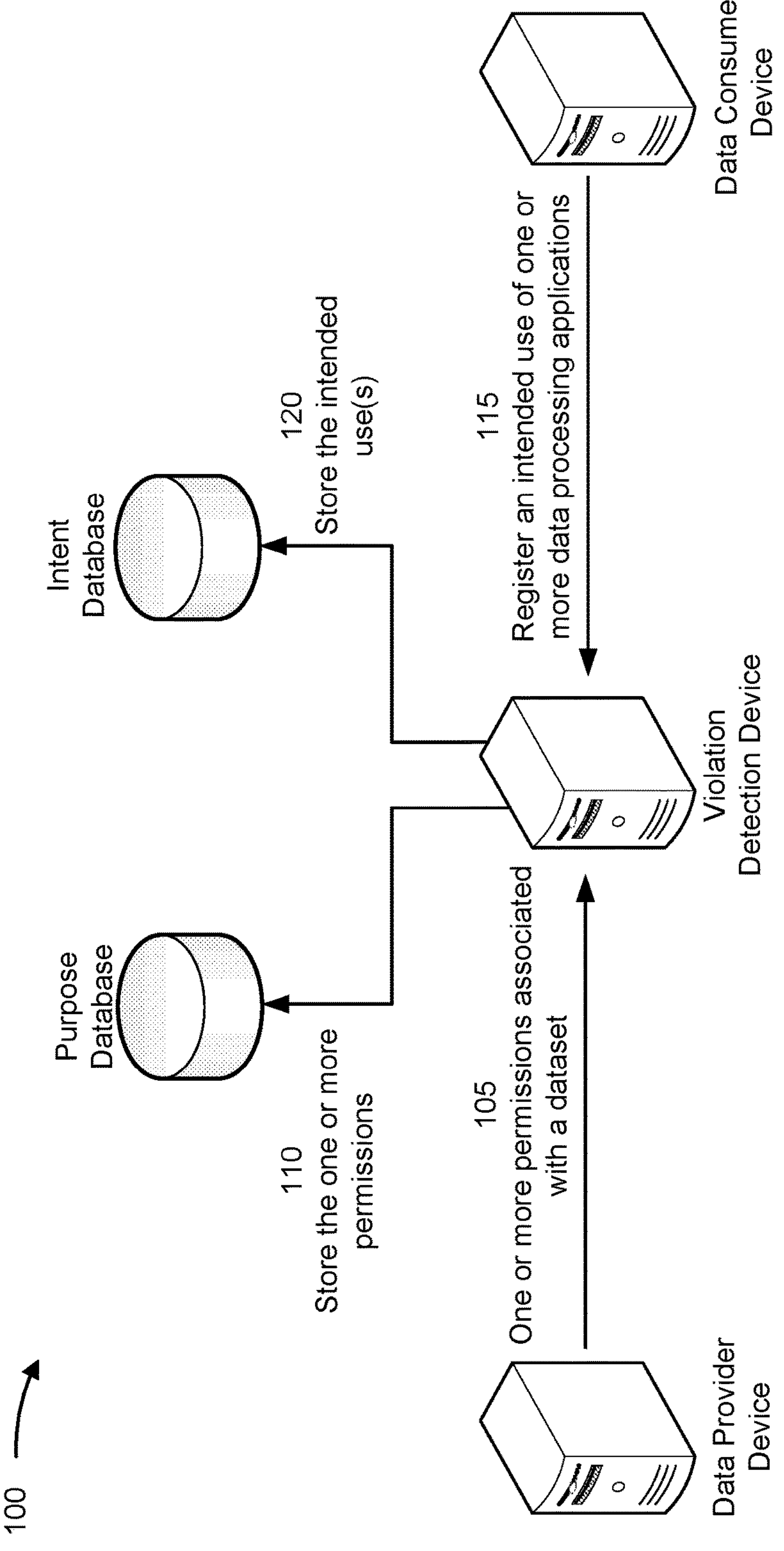
FIGS. 1A-1C are diagrams of an example associated with a trusted execution environment for data sharing, in accordance with some embodiments of the present disclosure.

The following detailed description of example implementations refers to the accompanying drawings. The same reference numbers in different drawings may identify the same or similar elements.

An owner of data (e.g., a user associated with the data and/or another user or entity that owns the data) may share the data with various entities or users (e.g., third parties). In some cases, the owner of the data may share the data subject to one or more permissions. For example, the one or more permissions may indicate a purpose for which the data is shared. For example, the one or more permissions may define one or more permitted uses of the data. For example, the one or more permissions may define permitted uses of the shared data (e.g., a category or type of data processing application that can be applied to the shared data), how the data is to be shared (e.g., a sharing method), the data that is available to be shared, one or more permitted recipients or consumers of the shared data, access permissions (e.g., defining what actions can performed on the shared data), access controls (e.g., defining field-level or record-level permissions, such as restricting access to specific parts of the shared data), and/or sharing options (e.g., setting an expiration date for the shared access, adding comments or instructions for the consumers, or specifying whether the consumers can further share the data with others), among other examples. However, ensuring that the one or more permissions associated with the shared data are enforced or followed is challenging.

For example, the owner of the data may share the data with an entity (e.g., subject to one or more permissions). The entity may use or process the data internally and/or may share the data with one or more other entities. However, after the data is initially shared in connection with the one or more permissions, it is difficult to ensure that the one or more permissions follow the data as it is shared. For example, the data may be copied and/or recreated across different platforms, systems, and/or databases for data processing and/or analysis. When data is shared across multiple systems or databases, keeping the shared data synchronized and maintaining consistent permissions can be challenging because of the different formats, structures, and/or programming languages used. Additionally, enforcing permissions at a granular level can be challenging, especially when dealing with complex data structures or large datasets. Further, in complex environments, integrating different systems, applications, and/or platforms can pose challenges for enforcing data sharing permissions consistently.

For example, when data is initially shared, the data may be shared for a given purpose. A data consumer (e.g., an entity receiving, using, processing, and/or otherwise consuming the shared data) may store the data (e.g., in an internal data storage system) in connection with an indication of the given purpose. A team or individual within the entity may obtain the data to process or otherwise use the data for the given purpose. However, when the team or individual obtains the data, the team or individual may create a copy of the data (e.g., in the internal data storage system) to be used for processing and/or analysis (e.g., so as to not damage or corrupt the original copy of the shared data). However, it is difficult to ensure that the copy of the data is created with the same permission(s) as the originally shared data. As the data is analyzed and/or processed by different teams or individuals, more copies of the data may be generated, increasing the risk that the data sharing permissions are not consistently enforced. For example, a copy may be generated to be analyzed or consumed in accordance with the permission(s). However, the copy of the data may not have any indications of the permission(s). Therefore, another team, entity, and/or individual may obtain the copy of the data and use the data for an unauthorized purpose. In other words, even though a team or individual may be permitted to access the data (e.g., in accordance with the permission(s)), it is difficult to ensure that the permission(s) are enforced, such as after the team or individual generates one or more copies of the data.

This increases a security risk of the shared data and reduces the privacy of the shared data. Further, this creates liability for the entity who receives the data because the data may be used for an unauthorized purpose. Additionally, because many different copies of the data may be created across different teams, systems, applications, platforms, and/or databases, it is difficult to track whether the shared data is being used in accordance with the permission(s) associated with the shared data. As a result, the entity who receives and/or the owner of the data may be unaware of unauthorized uses of the data.

In some cases, data lineage may be used to track the transformations and/or use of data over time. "Data lineage" may refer to comprehensive documentation and tracking of the origin, movement, transformation, and consumption of data throughout a lifecycle. Data lineage may provide a historical record that traces the path of data from a source to a destination, enabling an entity to understand how data is collected, manipulated, and used within systems of the entity. Data lineage may support regulatory compliance efforts by providing a detailed audit trail of data movements and transformations. This may help an entity to demonstrate data lineage for compliance purposes, such as meeting regulatory requirements, ensuring data privacy, and/or establishing data provenance, among other examples. However, data lineage mechanisms are retroactive and may only be capable of detecting unauthorized uses of data well after the unauthorized uses have occurred. Additionally, data lineage mechanisms may not be scalable for complex organizations associated with many different systems, platforms, data formats, and/or applications, among other examples.

Some implementations described herein enable a trusted execution environment for data sharing. For example, the trusted execution environment may be a distributed environment that is centrally managed in real-time (e.g., via a core execution environment). For example, the core execution environment may ensure data sharing and data usage in real time. The trusted execution environment may include distributed execution environments for data providers and data consumers, respectively. For example, the trusted execution environment may include a data provider execution environment associated with a data provider (e.g., a user or entity that provides data to be shared). The trusted execution environment may include a data consumer execution environment associated with a data consumer (e.g., a user or entity that obtains the shared data for processing or analysis).

The core execution environment may obtain, via a data provider execution environment, an indication of one or more permissions associated with a dataset shared by the data provider via the data provider execution environment (e.g., where the dataset is only available to be retrieved via the data provider execution environment). The one or more permissions may indicate a purpose for which the dataset is shared. The core execution environment may obtain, via a data consumer execution environment, an indication of one or more data processing applications associated with respective intents. The one or more data processing applications may be executable via the data consumer execution environment. The intents indicate an intended use of data via the one or more data processing applications (e.g., an intended use of a processing application or function associated with the one or more data processing applications). For example, a data consumer may register one or more data processing applications with the core execution environment.

In some implementations, the core execution environment and/or the data consumer execution environment may be configured to enable only registered data processing applications to be executed in the data consumer execution environment. Further, data may only be accessed (e.g., from a data provider execution environment) via a data consumer execution environment that is configured within the trusted execution environment and/or registered with the core execution environment.

The distributed execution environments (e.g., the data provider execution environment(s) and/or the data consumer execution environment(s)) may be configured to provide indications of interactions that occur within the distributed execution environments with the core execution environment. For example, a data provider execution environment may provide data access indications (e.g., indicating that data has been retrieved, obtained, or otherwise accessed from the data provider execution environment). Further, a data consumer execution environment may provide data usage indications (e.g., indicating that data has been used by a given registered data processing application within the data consumer execution environment). The core execution environment may be configured to detect that a data processing application has accessed and processed data from the dataset in a data consumer execution environment (e.g., via a data usage indication). The core execution environment may be configured to compare the one or more permissions (e.g., associated with the accessed data) to an intent associated with the data processing application. The core execution environment may be configured to perform an action if the intent is not permitted by the one or more permissions.

As a result, data usage violations may be quickly detected because the core execution environment is configured to monitor and/or manage data usage as the data usage occurs. By configuring separate, distributed execution environments for data providers and data consumers (e.g., that are configured with limitations and/or rules for data sharing and data usage), the core execution environment can consistently, efficiently, and transparently manage and enforce permissions associated with shared data. This improves the ability for an entity to detect when data has been misused, enabling the entity to quickly take corrective action and/or notify a data provider associated with the misused data. The improved ability to detect data usage violations may improve the likelihood that a data provider will grant access to data being shared (e.g., because of an increased trust level that the data will be properly used and that any misuses will be quickly reported), improving access to data and improved operations associated with data consumers (e.g., that may now have access to an increased amount of data). Further, the separate and distributed execution environments for data providers and data consumers enable improved scalability for the trusted execution environment because each data consumer and/or data provider may separately manage the infrastructure for the separate and distributed execution environments.

Figure 1B:
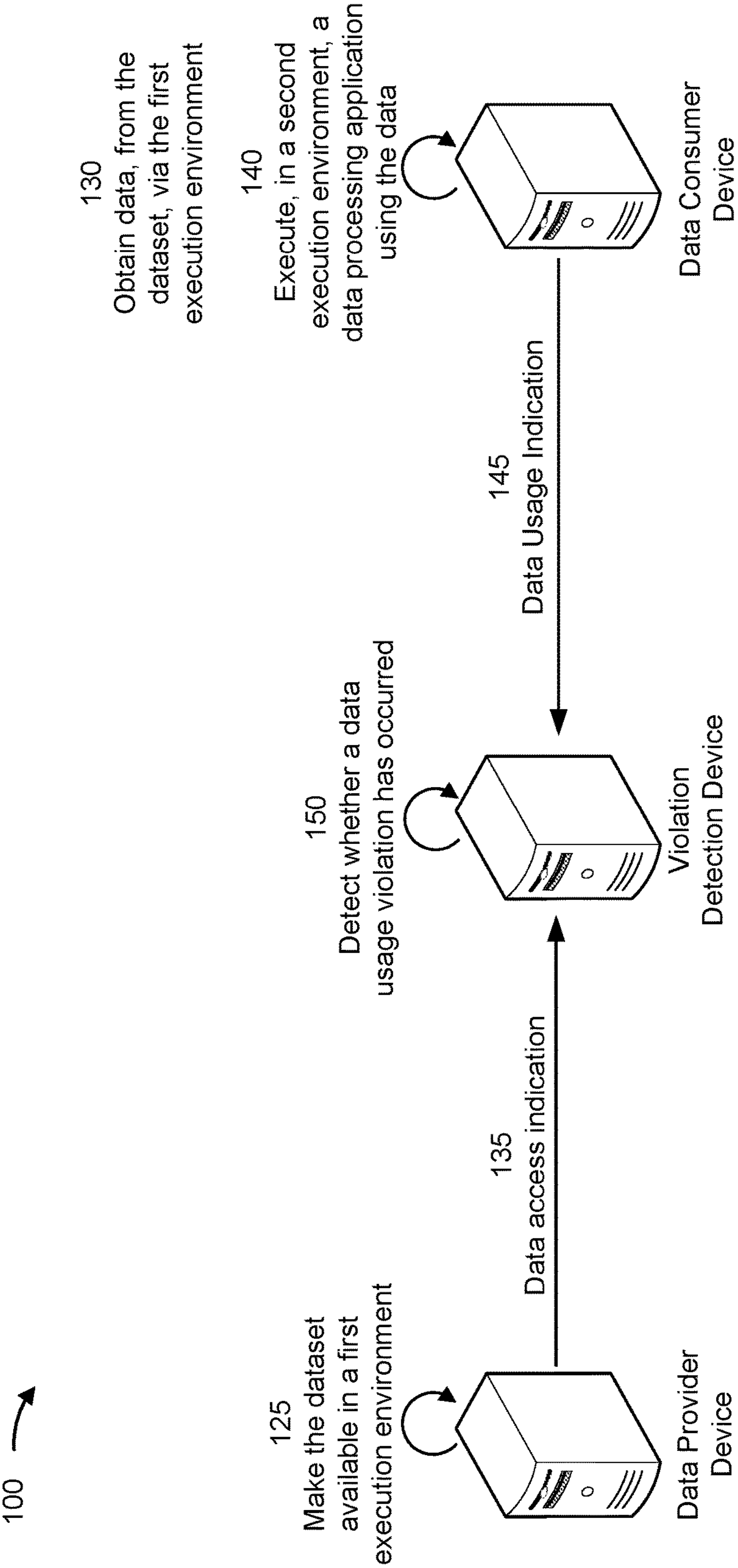
Figure 1C:
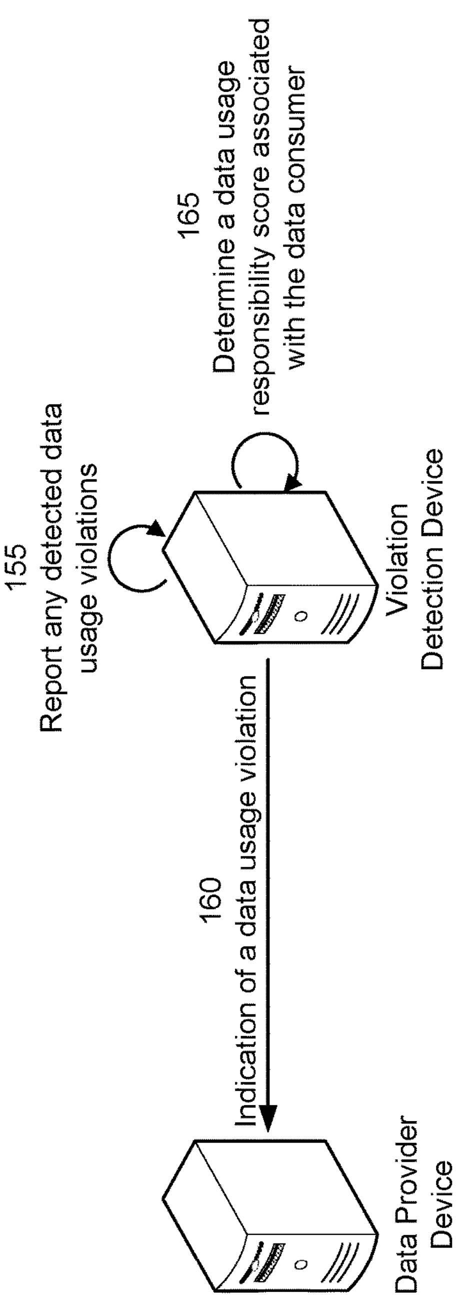
Figure 1C:

FIGS. 1A-1C are diagrams of an example 100 associated with a trusted execution environment for data sharing. As shown in FIGS. 1A-1C, example 100 includes a violation detection device, a data provider device, a data consumer device, a purpose database (also referred to as a permissions database), and an intent database. These devices are described in more detail in connection with FIGS. 2, 3, and 4.

The violation detection device may be associated with a core execution environment, the data provider device may be associated with a data provider execution environment, and the data consumer device may be associated with a data consumer execution environment. The different execution environments are depicted and described in more detail in connection with FIG. 2. As used herein, the violation detection device performing an operation may refer to the core execution environment being configured to perform the operation. Reference to the data provider device performing an operation may refer to the data provider execution environment being configured to perform the operation. Similarly, reference to the data consumer device performing an operation may refer to the data consumer execution environment being configured to perform the operation.

As used herein, "execution environment" may refer to a configuration and/or infrastructure in which a software application or program executes. For example, an execution environment may include a set of resources, settings, and conditions necessary for the execution of code, such as hardware, operating systems, software libraries, dependencies (e.g., external software libraries, modules, and/or components that an application relies on to function correctly, such as database systems, web servers, messaging queues, application programming interface (API) libraries, or other third-party software), runtime environments, and/or network configurations (e.g., internet protocol (IP) addresses, ports, firewall rules, network protocols, and/or security configurations), among other examples.

For example, an execution environment may include, or refer to, a combination of hardware, operating system, runtime environment, software dependencies, network configuration, security measures, configuration parameters, and/or monitoring capabilities associated with executing software code successfully. An execution environment may provide the necessary infrastructure and/or resources to support the execution and functioning of applications or programs in a specific computing environment. In some implementations, an execution environment may be, or may include, a cloud computing environment.

The data provider device may be associated with a data provider. The data provider may be a user (e.g., an individual) and/or an entity. The data provider may own, provide, control, and/or otherwise be associated with data (e.g., a dataset). The data consumer device may be associated with a data consumer. The data consumer may also be referred to as a data user or a data receiver. The data consumer may be a user (e.g., an individual), a team, and/or an entity. The data consumer may obtain, receive, process, analyze, and/or otherwise use data that is shared (e.g., by a data provider). In some implementations, the data consumer device and the violation detection device may be associated with the same entity (e.g., the data consumer may be a consumer of data within the entity, such as a user, employee, or team associated with the entity). In other implementations, the data consumer device and the violation detection device may be associated with different entities.

As shown in FIG. 1A, and by reference number 105, the data provider device may transmit, and the violation detection device may receive or obtain, an indication of one or more permissions associated with a dataset. For example, the violation detection device may obtain an indication of one or more permissions associated with a dataset shared by the data provider device. The one or more permissions may indicate a purpose for which the dataset is shared. For example, the one or more permissions may include permitted uses of the shared data (e.g., a category or type of data processing application that can be applied to the shared data), how the data is to be shared (e.g., a sharing method), the data that is available to be shared, one or more permitted recipients or consumers of the shared data, access permissions (e.g., defining what actions can performed on the shared data), access controls (e.g., defining field-level or record-level permissions, such as restricting access to specific parts of the shared data), and/or sharing options (e.g., setting an expiration date for the shared access, adding comments or instructions for the consumers, or specifying whether the consumers can further share the data with others), among other examples. For example, the one or more permissions may indicate a type or category of data usage that is permitted, such as analytics, marketing, finance, healthcare, and/or supply chain processing, among other examples.

In some implementations, the data provider device may provide, or otherwise make available, the dataset. For example, the data provider device may provide, or otherwise make available, the dataset via a data provider execution environment (e.g., that is associated with the data provider device). In some implementations, the violation detection device may obtain the indication of the one or more permissions associated with the dataset via the data provider execution environment. In other examples, the data provider device may provide, or otherwise make available, the dataset to the violation detection device (or another device associated with the core execution environment). In such examples, the violation detection device (or the other device associated with the core execution environment) may provide, or otherwise make available, the dataset via the data provider execution environment.

As shown by reference number 110, the violation detection device may store an indication of the one or more permissions. For example, the violation detection device may store the indication of the one or more permissions in the purpose database. As an example, the violation detection device may generate (e.g., create or insert) one or more entries in the purpose database associated with the dataset. The one or more entries may include or indicate an identifier associated with the dataset. The identifier may be an identifier of the data provider (e.g., the data provider device) and/or may be unique to the dataset. This may enable the violation detection device to quickly search for and/or identify the one or more permissions when data from the dataset is accessed and/or used.

The violation detection device may obtain and/or store permission(s) associated with other datasets in a similar manner. The other datasets may be associated with (e.g., provided by or shared by) the data provider device or other data provider devices. For example, the purpose database may include a collection of indications of shared datasets and respective permissions (e.g., purposes for which the datasets are shared) associated with the shared datasets.

As shown by reference number 115, the data consumer device may register an intended use of one or more data processing applications. As used herein, "data processing application" may refer to any application that obtains, processes, analyzes, transforms, and/or otherwise uses shared data (e.g., data shared by the data provider device). For example, a data processing application may be an application, a system, a computer program, an API, a function, software, and/or an operating system, among other examples. The "intended use" of a data processing application may refer to a purpose for which the data processing application is using shared data and/or an outcome or output of the data processing application. The intended use may include marketing, advertising, analytics, communications, finance, healthcare, machine learning, research and development, business analytics, and/or personalization and customization (e.g., to personalize offerings to an individual), among other examples.

Additionally, or alternatively, the intended use may include information associated with how the data processing application uses data. For example, the intended use may include an indication of an amount of time that the data processing application has access to and/or stores the data. As another example, the intended use may include an indication of access controls associated with the data processing application (e.g., who has access to the data, for how long access to the data is granted, whether copies of the data will be made, whether the data is stored, and/or how or where the data is stored, among other examples). As another example, the intended use may include an indication of security information associated with the data processing application, such as security permissions, security roles, a security level, and/or a security protocol, among other examples.

The data consumer device may provide, and the violation detection device may obtain, an indication of one or more data processing applications associated with respective intents. The intents may indicate the intended use of data via the one or more data processing applications. The data consumer device may provide the indication of a data processing application and a corresponded intended use as part of a registration procedure for the data processing application. For example, the data consumer device may provide, and the violation detection device may obtain, registration information associated with the data processing application. The registration information may include an indication of the data processing application and/or an indication of the intended use associated with the data processing application. Additionally, or alternatively, the registration information may include an indication of the information associated with how the data processing application uses data, such as access controls, and/or security information, among other examples.

Additionally, or alternatively, the registration information may include information associated with the data processing application. For example, the registration information may include a name of the data processing application, an identifier of the data processing application, and/or a description of the data processing application (e.g., a description of the intended use), among other examples. In some implementations, the registration information may include information associated with a software package of the data processing application. For example, the registration information may include one or more code files, dependencies (e.g., software, libraries, and/or components needed for the data processing application to function), release notes, system requirements (e.g., minimum hardware and/or software specifications needed to execute the data processing application), third-party components (e.g., a list of one or more third-party components or third-party software that are incorporated into the data processing application), and/or privacy policy information (e.g., information about how data is collected, used, and protected by the data processing application, such as any data sharing practices), among other examples.

The violation detection device may determine whether to register the data processing application. For example, the violation detection device may determine whether the data processing application is approved for use in the data consumer execution environment associated with the data consumer device. The data consumer execution environment may be configured to allow or permit only registered and/or approved data processing applications to be executed via the data consumer execution environment.

The violation detection device may register the data processing application based on receiving the registration information. For example, in some cases, the violation detection device may register all data processing applications so long as the violation detection device obtains corresponding registration information. In some implementations, the violation detection device may determine whether to register the data processing application based on the registration information. For example, the violation detection device may determine whether to register the data processing application based on the intended use associated with the data processing application (e.g., where the intended use is indicated by the registration information). For example, the violation detection device may store one or more permitted uses and/or one or more prohibited uses. If the intended use is included in the one or more permitted uses, then the violation detection device may determine to register the data processing application. If the intended use is not included in the one or more permitted uses, then the violation detection device may determine to not register the data processing application. As another example, if the intended use is included in the one or more prohibited uses, then the violation detection device may determine to not register the data processing application. If the intended use is not included in the one or more prohibited uses, then the violation detection device may determine to register the data processing application.

Additionally, or alternatively, the violation detection device may register the data processing application based on the information associated with the software package of the data processing application. For example, the violation detection device may determine whether system requirements of the data processing application are supported by the data consumer execution environment (e.g., to determine whether the data consumer execution environment is capable of supporting the data processing application). If the system requirements of the data processing application are supported by the data consumer execution environment, then the violation detection device may determine to register the data processing application.

Additionally, or alternatively, the violation detection device may analyze the information associated with the software package to determine whether any privacy risk indicators are detected. For example, the violation detection device may analyze one or more code files, a description, a user guide or manual, and/or release notes, among other examples, to determine the intended use associated with the data processing application. The violation detection device may detect a privacy risk indicator based on determining that the data processing application has an intended use that is different than the intended use indicated by the data consumer device and/or has an intended use that was not indicated by the data consumer device. As another example, the violation detection device may detect a privacy risk indicator based on the data processing application being associated with one or more third-party components and/or third-party software. As another example, the violation detection device may detect a privacy risk indicator based on the privacy policy information associated with the data processing application. For example, if the privacy policy information does not meet minimum standards defined for the data consumer execution environment and/or indicates that data may be shared outside of the data consumer execution environment, then the violation detection device may detect a privacy risk indicator. If the violation detection device detects one or more privacy risk indicators (e.g., any privacy risk indicators and/or a certain quantity of privacy risk indicators), then the violation detection device may determine to not register the data processing application.

If the violation detection device determines to register the data processing application, then the violation detection device may provide, and the data consumer device may obtain, a communication indicating that the data processing application has been registered for operation in the data consumer execution environment. In some implementations, the communication may include information that enables the data processing application to be executed via the data consumer execution environment. Without the information that enables the data processing application to be executed via the data consumer execution environment, the data processing application may be prevented and/or restricted from executing in the data consumer execution environment. For example, the information may include a permission role, a digital signature, and/or an application control signature, among other examples. For example, the violation detection device may add the data processing application to a list of approved applications associated with the data consumer execution environment (e.g., a whitelist).

As shown by reference number 120, the violation detection device may store an indication of the intended use associated with the data processing application in the intent database. For example, the violation detection device may create one or more entries (e.g., in the intent database) that indicate the data processing application (e.g., an identifier associated with the data processing application) and the corresponding intended use of the data processing application. In some implementations, the violation detection device may store information indicated by the registration information associated with the data processing application. This enables the violation detection device to quickly and reliably identify an actual use of data in response to the data processing application obtaining and/or processing data in the data consumer execution environment. The violation detection device may register and/or store information associated with other data processing applications in a similar manner as described above.

As shown in FIG. 1B, and by reference number 125, the data provider device may make the dataset available in the data provider execution environment (e.g., a first execution environment). Making the dataset available in the data provider execution environment may refer to the data provider device providing or transmitting the dataset to a device associated with the data provider execution environment and/or storing the dataset in memory associated with the data provider execution environment. The data provider execution environment may be configured to allow access to the dataset to devices associated with one or more (or any) data consumer execution environments.

For example, as shown by reference number 130, the data consumer device may obtain data included in the dataset via the data provider execution environment. For example, the data consumer device may transmit, to the data provider device, a request for the data (e.g., identifying the data). The data provider device may provide, and the data consumer device may obtain, the data. For example, the data consumer device may transmit an API call indicating the request for the data. The API may enable data to be exchanged between distributed execution environments that are included in the trusted execution environment. For example, the API may be an interface that enables data to be exchanged between the data provider execution environment and the data consumer execution environment.

As shown by reference number 135, the data provider device may provide, and the violation detection device may obtain, a data access indication. For example, the data provider device may provide the data access indication in response to providing the data to the data consumer device. For example, the data provider execution environment may be configured to log or report data access with the violation detection device. The data access indication may indicate the data that was accessed (e.g., from the dataset), the data consumer execution environment from which the data was accessed, and/or an identifier of the data consumer execution environment or the data consumer device, among other examples. In some implementations, the violation detection device may obtain the data access indication by accessing a data access log maintained by the data provider execution environment. For example, the data provider execution environment may be configured to provide log access to the core execution environment (e.g., to the violation detection device).

The data access indication enables the violation detection device to identify when data is accessed by a data consumer in real time, thereby alerting the violation detection device to prepare to check for data use violations of the shared data. For example, the data access indication enables the violation detection device to obtain advance notice of the data access (e.g., before an indication from the data consumer device after the data has already been processed, used, and/or analyzed). For example, the violation detection device may, in response to obtaining the data access indication, obtain one or more permissions associated with the dataset or the data (e.g., from the purpose database). If the data consumer execution environment is associated with an intended use (e.g., is associated with only data processing applications that are associated with one or more intended uses) that is not permitted by the one or more permissions, then the violation detection device may detect a data usage violation (e.g., before obtaining an indication from the data consumer device of the actual data usage). This reduces a delay associated with detecting a data usage violation because the violation detection device is enabled to obtain the one or more permissions and/or detect the data usage violation earlier in time.

As shown by reference number 140, the data consumer device may execute, via the data consumer execution environment (e.g., a second execution environment included in the trusted execution environment), a data processing application using the data. For example, the data consumer device may execute the data processing application (e.g., via the data consumer execution environment) to process, analyze, transform, and/or otherwise use the data. In some implementations, the data consumer device may execute the data processing application based on an intended use of the data processing application being permitted by a permission, from the permissions, associated with the data.

As shown by reference number 145, the data consumer device may provide, and the violation detection device may obtain, a data usage indication. The data usage indication may indicate data that has been accessed and corresponding data processing applications executed in connection with the data that has been accessed. The data usage indication may indicate the data that was accessed and/or the data processing application that processed, analyzed, or otherwise used the data. In some implementations, the data consumer device may be configured to provide data usage indications in response to a data processing application initiating and/or completing a process or operation (e.g., that uses the data). In some implementations, the violation detection device may obtain the data usage indication by accessing a data usage log maintained via the data consumer execution environment. For example, the data usage log may indicate records of data that has been accessed and corresponding data processing applications executed in connection with the data that has been accessed. The data usage indication may trigger the violation detection device to determine whether a data usage violation has occurred.

For example, as shown by reference number 150, the violation detection device may detect whether a data usage violation has occurred associated with the data processing application (e.g., as indicated by the data usage indication) that has accessed and processed data from the dataset (e.g., as indicated by the data usage indication and/or the data access indication) in the data consumer execution environment. A data usage violation may indicate that data has been accessed, analyzed, processed, and/or otherwise used in a manner that is not permitted by one or more permissions associated with the data.

For example, the violation detection device may detect that the data processing application has accessed and processed data from the dataset in the data consumer execution environment (e.g., based on the data usage indication). The violation detection device may compare one or more permissions associated with the data to an intent associated with the data processing application. For example, the violation detection device may obtain (e.g., from the purpose database and in response to the data access indication and/or the data usage indication) the one or more permissions associated with the data. The violation detection device may obtain (e.g., from the intent database and in response to the data usage indication) the intended use associated with the data processing application. The violation detection device may determine whether the intended use of the data processing application is permitted by the one or more permissions associated with the data. If the intended use is permitted by the one or more permissions, then the violation detection device may determine that no data usage violation has occurred. However, if the intended use is not permitted by the one or more permissions, then the violation detection device may detect that a data usage violation has occurred.

For example, the one or more permissions may indicate that the data may be shared for financial purposes and/or for personalization purposes. Additionally, or alternatively, the one or more permissions may indicate that the data is not to be used for marketing purposes. The intended use of the data processing application may indicate that the data processing application uses data for marketing purposes. As a result, the violation detection device may detect a data usage violation. As another example, the one or more permissions may indicate that the data is not to be used by applications that use third-party software and/or components. The intended use of the data processing application may indicate that the data processing application uses third-party software and/or components. As a result, the violation detection device may detect a data usage violation. As another example, the one or more permissions may indicate that the data is not to be used by applications that store data after using the data for a process or operation. The intended use of the data processing application may indicate that the data processing application and/or the data consumer device stores data after completing operations or processes associated with the data processing application. As a result, the violation detection device may detect a data usage violation.

As shown in FIG. 1C, the violation detection device may perform one or more actions based on detecting a data usage violation. For example, the violation detection device may perform one or more actions if the intent of the data processing application is not permitted by the one or more permissions associated with the data accessed by the data processing application.

For example, as shown by reference number 155, the one or more actions may include the violation detection device reporting any detected data usage violations. The violation detection device may transmit, to a device (e.g., a server device) associated with a governmental or regulatory agency, an indication of the data usage violation. For example, the governmental or regulatory agency may be associated with enforcing user data privacy regulations and/or rules.

Additionally, or alternatively, as shown by reference number 160, the violation detection device may transmit, and the data provider device may obtain or receive, an indication of the data usage violation. For example, the violation detection device may report data usage violations to the owner of the data associated with the data usage violations (e.g., the data provider). The indication of the data usage violation may include an indication of the data (e.g., that was accessed), the data processing application, the intended use of the data processing application, and/or the data consumer, among other examples. For example, the indication of the data usage violation may indicate what data was accessed and how the data was used.

In some implementations, the indication of the data usage violation may include a recommendation to update or modify the one or more permissions associated with the data or the dataset that includes the data. For example, the recommendation may be to remove or block data access for the data consumer and/or the data processing application. In some implementations, the one or more actions performed by the violation detection device may include automatically removing or blocking data access for the data consumer and/or the data processing application. In some implementations, the one or more actions performed by the violation detection device may include transmitting, to the data consumer device, an indication of the data usage violation. In some implementations, the one or more actions may include storing, in a violation log associated with the core execution environment, an indication of a data usage violation associated with the data consumer based on the intent not being permitted by the one or more permissions.

As shown by reference number 165, the violation detection device may determine a data usage responsibility score associated with the data consumer based on data usage via the one or more data processing applications executed in the data consumer execution environment and any violations detected associated with the data usage. The data usage responsibility score may be a score or an index that is indicative of a responsibility level or a trustworthiness level of the data consumer with data that is shared with the data consumer. The data usage responsibility score may be based on data usage (and/or data usage violations) that occurs in all data consumer execution environments associated with the data consumer. Additionally, or alternately, a data usage responsibility score may be specific to a given data consumer execution environment.

In some implementations, the data usage responsibility score may be based on one or more criteria. The one or more criteria may include a quantity of data usage violations, a severity of the data usage violations, a frequency of data usage violations, and/or other criteria indicative of the responsibility of the data consumer with data that is shared with the data consumer. The violation detection device may assign weights to respective criteria from the one or more criteria. The violation detection device may determine the data usage responsibility score by quantifying one or more data usage occurrences by the data consumer and/or one or more data usage violations. For example, the violation detection device may assign numerical values to the one or more data usage occurrences and/or one or more data usage violations (e.g., where a more severe data usage violation has a higher numerical value). The violation detection device may determine the data usage responsibility score by aggregating the numerical values and/or by applying the numerical values to a formula.

In some implementations, the one or more actions performed by the violation detection device (e.g., based on detecting a data usage violation) may include modifying the data usage responsibility score associated with the data consumer. The data usage responsibility score may be used by the violation detection device as part of determining whether to register a data processing application associated with the data consumer. For example, if the data usage responsibility score does not satisfy a first threshold, then the violation detection device may determine that no additional data processing applications associated with the data consumer are to be registered (e.g., because the data consumer has a low responsibility level associated with shared data). Additionally, or alternatively, the violation detection device may provide, to the data provider device, an indication of data usage responsibility scores associated with respective data consumers (e.g., to facilitate the data provider determining the one or more permissions associated with shared data). For example, this may enable the data provider to block or restrict access for data consumers that are associated with lower data usage responsibility scores. Additionally, this provides an incentive for data consumers to be more responsible with the use of user data because an improved data usage responsibility score may result in increased data access for the data consumer (e.g., because a data provider may be more willing to share data with a data consumer that has a history of responsible data usage).

As indicated above, FIGS. 1A-1C are provided as an example. Other examples may differ from what is described with regard to FIGS. 1A-1C.

Figure 2:
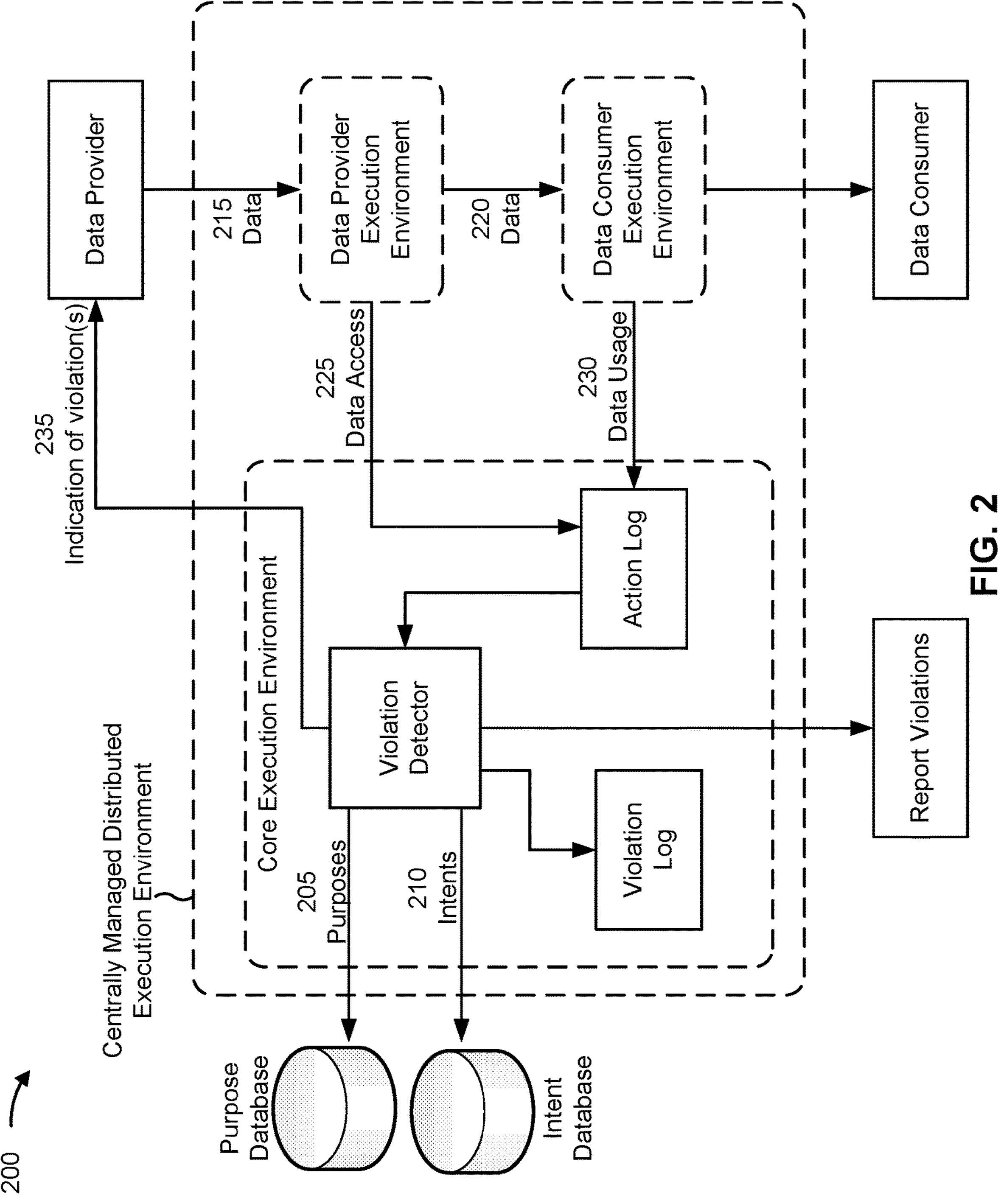
FIG. 2 is a diagram of an example architecture in which systems and/or methods described herein may be implemented, in accordance with some embodiments of the present disclosure.

FIG. 2 is a diagram of an example architecture 200 in which systems and/or methods described herein may be implemented. As shown in FIG. 2, the architecture 200 may include a centrally managed and distributed execution environment (e.g., the trusted execution environment). The trusted execution environment may include a core execution environment. The core execution environment may include a violation detector (e.g., the violation detection device).

The trusted execution environment may include one or more data provider execution environments (shown as a single data provider execution environment in FIG. 2 for ease of depiction and description). A data provider execution environment may be associated with a data provider. For example, the data provider device described elsewhere herein may be included in the data provider execution environment or may be the data provider depicted in FIG. 2. A data provider execution environment may include computing infrastructure that is managed and/or controlled by the data provider.

The trusted execution environment may include one or more data consumer execution environments (shown as a single data consumer execution environment in FIG. 2 for ease of depiction and description). A data consumer execution environment may be associated with a data consumer. For example, the data consumer device described elsewhere herein may be included in the data consumer execution environment or may be the data consumer depicted in FIG. 2. A data consumer execution environment may include computing infrastructure that is managed and/or controlled by the data consumer.

The data consumer may only be permitted to access data (e.g., a dataset shared by the data provider) from the data provider execution environment. For example, the data consumer execution environment may refrain from accessing data from a source outside of a data provider execution environment. Additionally, the data consumer may only be permitted to perform one or more actions associated with the data via the data consumer execution environment. For example, the data consumer execution environment my only permit data processing applications that have registered intents via the core execution environment to be executed in the data consumer execution environment. For example, the data consumer execution environment may refrain from executing any data processing applications that have not been registered with the core execution environment. This ensures that the core execution environment (e.g., the violation detector) is enabled to identify the actual use of data by the data consumer to facilitate data usage violation detections.

For example, as shown by reference number 205, the violation detector may store purposes for which data is shared via the data provider execution environment in a purpose database (e.g., the purpose database depicted and/or described elsewhere herein). For example, the purposes may be indicated by one or more permissions in a similar manner as described in connection with FIGS. 1A-1C. Additionally, the violation detector may register one or more data processing applications associated with the data consumer and/or the data consumer execution environment. For example, as shown by reference number 210, the violation detector may store intents (e.g., intended use of data) associated with respective data processing applications in an intent database (e.g., in a similar manner as described in connection with FIGS. 1A-1C).

As shown by reference number 215, the data provider may make data available to be accessed by the data provider execution environment. As shown by reference number 220, the data consumer may access data from the data provider execution environment via the data consumer execution environment (e.g., via an API between the data provider execution environment and the data consumer execution environment). As shown by reference number 225, the data provider execution environment may be configured to provide a data access indication to the core execution environment in response to data being accessed from the data provider execution environment (e.g., in a similar manner as described in connection with reference number 135). As shown by reference number 230, the data consumer execution environment may be configured to provide a data usage indication to the core execution environment in response to data being used in the data consumer execution environment (e.g., in a similar manner as described in connection with reference number 145).

The core execution environment may store data access indications and/or data usage indications in an action log. The action log may be associated with indicating actions that have been performed in the trusted execution environment. For example, the violation detector may detect one or more data usage violations based on comparing a purpose associated with accessed data with an intended use of a data processing application that accessed and/or used the data (e.g., in a similar manner as described in connection with reference number 150). The violation detector may store detected data usage violations in a violation log.

As shown by reference number 235, the violation detector may provide an indication of any detected data usage violations to the data provider (e.g., in a similar manner as described in connection with reference number 160). Additionally, the violation detector may report any detected data usage violations to another entity or agency, as described in more detail elsewhere herein.

The architecture 200 enables the core execution environment to manage and/or track data usage in real-time. For example, by configuring the data provider execution environment(s) and the data consumer execution environment(s) as described herein, the core execution environment is enabled to ensure that the violation detector obtains indications of all data usage in the trusted execution environment. Additionally, the core execution environment is enabled to quickly compare the purpose(s) for which the data is shared to the usage of the data to detect data usage violations. Further, the architecture 200 is associated with improved scalability and/or reduced complexity because the data provider execution environment(s) and the data consumer execution environment(s) are distributed environments that have infrastructure managed by data providers and data consumers, respectively. For example, a data consumer and/or a data provider can configure an execution environment in accordance with a preferred operating system, format, and/or database structure, among other examples, so long as the execution environment is configured to perform the operations described herein. Further, as additional data providers and/or data consumers are added to the trusted execution environment, the architecture 200 can be easily scaled by adding a new execution environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of architecture 200 may perform one or more functions described as being performed by another set of devices of architecture 200.

Figure 3:
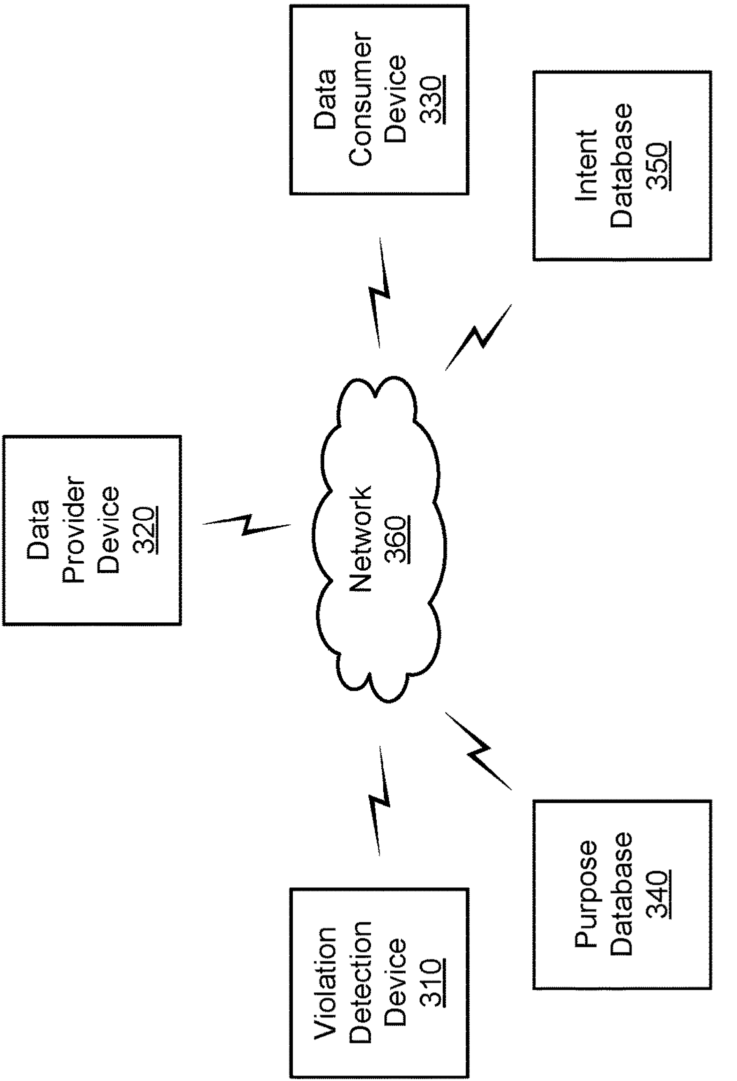
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a violation detection device 310, a data provider device 320, a data consumer device 330, a purpose database 340, an intent database 350, and a network 360. Devices of environment 300 may interconnect via wired connections, wireless connections, or a combination of wired and wireless connections.

The violation detection device 310 may include one or more devices capable of receiving, generating, storing, processing, providing, and/or routing information associated with a trusted execution environment for data sharing, as described elsewhere herein. The violation detection device 310 may include a communication device and/or a computing device. For example, the violation detection device 310 may include a server, such as an application server, a client server, a web server, a database server, a host server, a proxy server, a virtual server (e.g., executing on computing hardware), or a server in a cloud computing system. In some implementations, the violation detection device 310 may include computing hardware used in a cloud computing environment. In some implementations, the violation detection device 310 may be included in the core execution environment depicted in FIG. 2.

The data provider device 320 may include one or more devices capable of receiving, generating, storing, processing, providing, and/or routing information associated with a trusted execution environment for data sharing, as described elsewhere herein. The data provider device 320 may include a communication device and/or a computing device. For example, the data provider device 320 may include a server, such as an application server, a client server, a web server, a database server, a host server, a proxy server, a virtual server (e.g., executing on computing hardware), or a server in a cloud computing system. In some implementations, the data provider device 320 may include computing hardware used in a cloud computing environment. In some implementations, the data provider device 320 may be included in the data provider execution environment and/or associated with the data provider depicted in FIG. 2.

The data consumer device 330 may include one or more devices capable of receiving, generating, storing, processing, providing, and/or routing information associated with a trusted execution environment for data sharing, as described elsewhere herein. The data consumer device 330 may include a communication device and/or a computing device. For example, the data consumer device 330 may include a server, such as an application server, a client server, a web server, a database server, a host server, a proxy server, a virtual server (e.g., executing on computing hardware), or a server in a cloud computing system. In some implementations, the data consumer device 330 may include computing hardware used in a cloud computing environment. In some implementations, the data consumer device 330 may be included in the data consumer execution environment and/or associated with the data consumer depicted in FIG. 2.

The purpose database 340 may include one or more devices capable of receiving, generating, storing, processing, and/or providing information associated with a trusted execution environment for data sharing, as described elsewhere herein. The purpose database 340 may include a communication device and/or a computing device. For example, the purpose database 340 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the purpose database 340 may store information indicative of a purpose for which data is shared by a user or owner of the data, as described elsewhere herein. For example, the purpose database 340 may store data and respective permissions associated with the data indicating a purpose for which the data can be used, analyzed, and/or processed.

The intent database 350 may include one or more devices capable of receiving, generating, storing, processing, and/or providing information associated with a trusted execution environment for data sharing, as described elsewhere herein. The intent database 350 may include a communication device and/or a computing device. For example, the intent database 350 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the intent database 350 may store information indicative of an intended purpose of a data processing application, as described elsewhere herein. For example, the intent database 350 may store indications of data processing applications and respective intended uses associated with the data processing applications.

The network 360 may include one or more wired and/or wireless networks. For example, the network 360 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 360 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
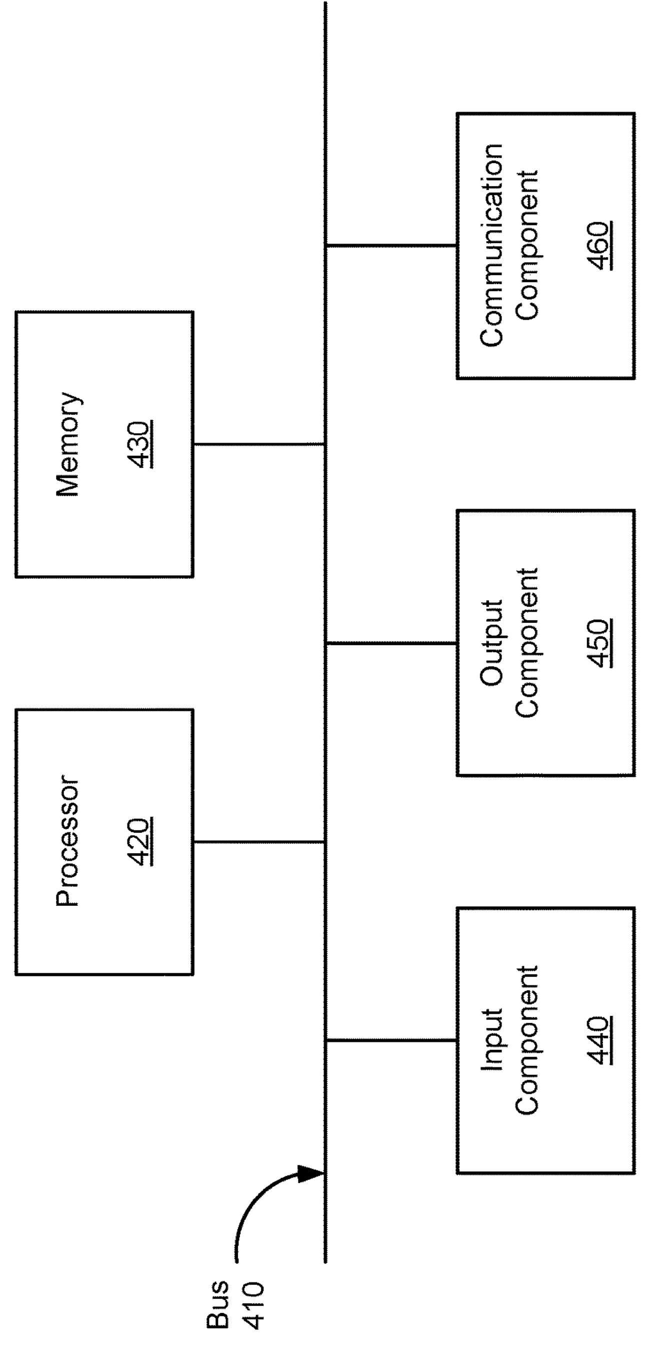
FIG. 4 is a diagram of example components of a device associated with a trusted execution environment for data sharing, in accordance with some embodiments of the present disclosure.

FIG. 4 is a diagram of example components of a device 400 associated with a trusted execution environment for data sharing. The device 400 may correspond to the violation detection device 310, the data provider device 320, the data consumer device 330, the purpose database 340, the intent database 350, and/or a block or component depicted in FIG. 2 (e.g., the violation detector, the violation log, the action log, the data provider, and/or the data consumer). In some implementations, the violation detection device 310, the data provider device 320, the data consumer device 330, the purpose database 340, the intent database 350, and/or a block or component depicted in FIG. 2 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
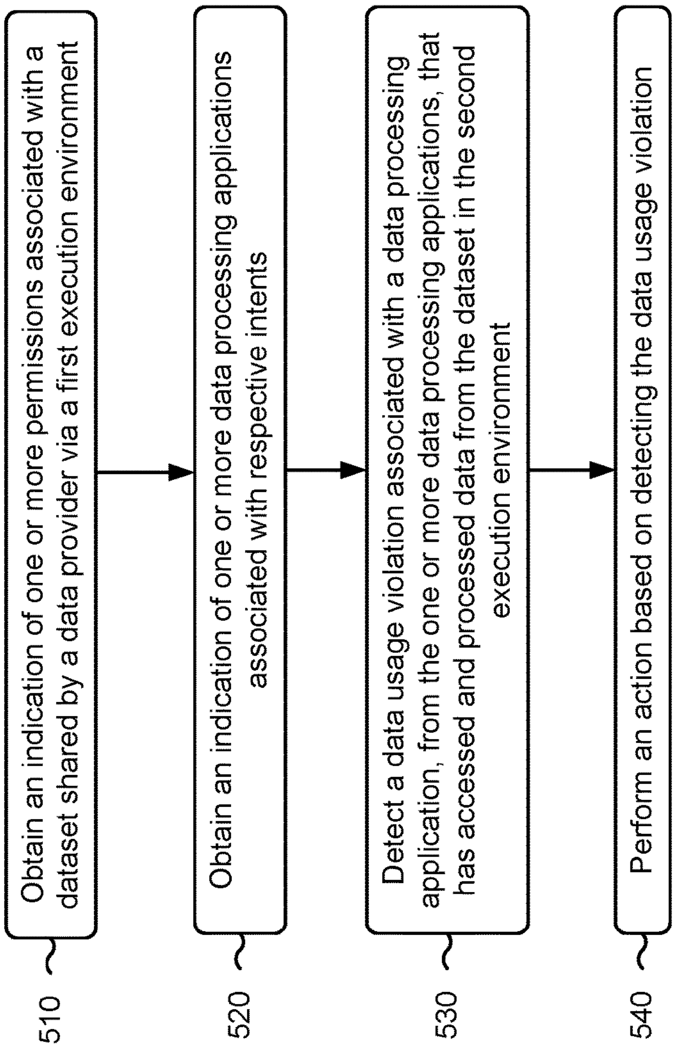
FIG. 5 is a flowchart of an example process associated with a trusted execution environment for data sharing, in accordance with some embodiments of the present disclosure.

FIG. 5 is a flowchart of an example process 500 associated with a trusted execution environment for data sharing. In some implementations, one or more process blocks of FIG. 5 may be performed by the violation detection device 310. In some implementations, one or more process blocks of FIG. 5 may be performed by another device or a group of devices separate from or including the violation detection device 310, such as the data provider device 320, the data consumer device 330, the purpose database 340, and/or the intent database 350. Additionally, or alternatively, one or more process blocks of FIG. 5 may be performed by one or more components of the device 400, such as processor 420, memory 430, input component 440, output component 450, and/or communication component 460. The one or more process blocks of FIG. 5 may be performed by the violation detection device 310 and/or another device or a group of devices in an architecture similar to the architecture depicted in FIG. 2. For example, the violation detection device 310 may be included in the core execution environment depicted in FIG. 2.

As shown in FIG. 5, process 500 may include obtaining an indication of one or more permissions associated with a dataset shared by a data provider via a first execution environment (block 510). For example, the violation detection device 310 (e.g., using processor 420 and/or memory 430) may obtain an indication of one or more permissions associated with a dataset shared by a data provider via a first execution environment, as described above in connection with reference number 105 of FIG. 1A. In some implementations, the one or more permissions indicate a purpose for which the data is shared. In some implementations, the first execution environment is associated with data sharing by the data provider. As an example, the first execution environment may be a data provider execution environment.

As further shown in FIG. 5, process 500 may include obtaining an indication of one or more data processing applications associated with respective intents (block 520). For example, the violation detection device 310 (e.g., using processor 420 and/or memory 430) may obtain an indication of one or more data processing applications associated with respective intents, as described above in connection with reference number 115 of FIG. 1A. In some implementations, the one or more data processing applications are associated with a data consumer. In some implementations, the one or more data processing applications are executable via a second execution environment that is associated with the data consumer. In some implementations, the respective intents indicate an intended use of data in association with the one or more data processing applications. The second execution environment may be a data consumer execution environment.

As further shown in FIG. 5, process 500 may include detecting a data usage violation associated with a data processing application, from the one or more data processing applications, that has accessed and processed data from the dataset in the second execution environment (block 530). For example, the violation detection device 310 (e.g., using processor 420 and/or memory 430) may detect a data usage violation associated with a data processing application, from the one or more data processing applications, that has accessed and processed data from the dataset in the second execution environment, as described above in connection with reference number 150 of FIG. 1B. In some implementations, the data usage violation is based on an intent, from the respective intents, associated with the data processing application not being permitted by the one or more permissions.

As further shown in FIG. 5, process 500 may include performing an action based on detecting the data usage violation (block 540). For example, the violation detection device 310 (e.g., using processor 420 and/or memory 430) may perform an action based on detecting the data usage violation, as described above in connection with FIG. 1C. As an example, the action may include providing an indication of the data usage violation to the data provider. As another example, the action may include reporting the data usage violation to a governmental and/or regulatory agency. As another example, the action may include determining and/or modifying a data usage responsibility score associated with the data consumer.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C and/or 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for trusted execution environments for data sharing, the system comprising:

a first execution environment associated with a data provider;

a second execution environment associated with a data consumer; and a core execution environment associated with managing data sharing between the data provider and the data consumer, wherein the core execution environment includes:

one or more memories; and one or more processors, communicatively coupled to the one or more memories, configured to:

obtain, via the first execution environment, an indication of one or more permissions associated with a dataset shared by the data provider via the first execution environment, wherein the one or more permissions indicate a purpose for which the dataset is shared;

store the indication of the one or more permissions;

obtain, via the second execution environment, an indication of one or more data processing applications associated with respective intents, wherein the one or more data processing applications are executable via the second execution environment, and wherein the respective intents indicate an intended use of data via the one or more data processing applications;

determine whether to register the one or more data processing applications based on comparing the intended use to the one or more permissions;

detect that a data processing application, from the one or more data processing applications, has accessed and processed data from the dataset in the second execution environment;

compare the one or more permissions to an intent, from the respective intents, associated with the data processing application; and transmit, to a device associated with the data provider and in response to determining that the intent is not permitted by the one or more permissions, an indication of a data usage violation associated with the data consumer based on the intent not being permitted by the one or more permissions.

2. The system of claim 1, wherein the data consumer is only permitted to access the dataset from the first execution environment, and wherein the data consumer is only permitted to perform one or more actions associated with the dataset via the second execution environment.

3. The system of claim 1, wherein the second execution environment only permits data processing applications, including the one or more data processing applications, that have registered intents via the core execution environment to be executed in the second execution environment.

4. The system of claim 1, wherein the one or more processors are further configured to:

store, in a violation log associated with the core execution environment, the indication of the data usage violation.

5. The system of claim 1, wherein the one or more processors, to detect that the data processing application has accessed and processed the data from the dataset, are configured to:

access a data usage log maintained via the second execution environment, wherein the data usage log indicates records of data that has been accessed and corresponding data processing applications executed in connection with the data that has been accessed.

6. The system of claim 1, wherein the one or more processors are further configured to:

determine a data usage responsibility score associated with the data consumer based on data usage via the one or more data processing applications executed in the second execution environment and any violations detected associated with the data usage, wherein a violation is associated with the respective intents not being permitted by respective permissions of data associated with the data usage.

7. The system of claim 1, wherein the first execution environment, the second execution environment, and the core execution environment are distributed environments.

8. A method for trusted execution environments for data sharing, comprising:

obtaining, by a device associated with a core execution environment, an indication of one or more permissions associated with a dataset shared by a data provider via a first execution environment, wherein the one or more permissions indicate a purpose for which the dataset is shared, and wherein the first execution environment is associated with data sharing by the data provider;

storing, by the device, the one or more permissions;

obtaining, by the device, an indication of one or more data processing applications associated with respective intents, wherein the one or more data processing applications are associated with a data consumer, wherein the one or more data processing applications are executable via a second execution environment that is associated with the data consumer, and wherein the respective intents indicate an intended use of data in association with the one or more data processing applications;

selectively registering the one or more data processing applications based on comparing the intended use to the one or more permissions;

detecting, by the device, a data usage violation associated with a data processing application, from the one or more data processing applications, that has accessed and processed data from the dataset in the second execution environment, wherein the data usage violation is based on an intent, from the respective intents, associated with the data processing application not being permitted by the one or more permissions; and transmitting, to at least one of a device associated with the data provider or a server device associated with a regulatory agency, a report indicating the data usage violation.

9. The method of claim 8, further comprising:

obtaining, via the first execution environment, one or more indications of data access, wherein the one or more indications of data access indicate data, from the dataset, that was accessed via the first execution environment and respective execution environments associated with the data that was accessed, and wherein the one or more indications of data access include an indication of data access associated with the data usage violation and the second execution environment.

10. The method of claim 8, further comprising:

obtaining, via the second execution environment, one or more indications of data usage, wherein the one or more indications of data usage indicate data that was accessed via the second execution environment and respective data processing applications associated with the data usage, and wherein the one or more indications of data usage include an indication of a data usage associated with the data usage violation and the data processing application.

11. The method of claim 8, wherein detecting the data usage violation comprises:

obtaining, via an intent database, an indication of the intent associated with the data processing application;

obtaining, via a permissions database, an indication of the one or more permissions; and determining that a use indicated by the intent is not permitted by the one or more permissions.

12. The method of claim 8, further comprising:

determining a data usage responsibility score associated with the data consumer based on data usage via the one or more data processing applications executed in the second execution environment.

13. The method of claim 12, further comprising:

modifying the data usage responsibility score associated with the data consumer based on detecting the data usage violation.

14. A non-transitory computer-readable medium storing a set of instructions, the set of instructions comprising:

one or more instructions that, when executed by one or more processors of a first device, cause the first device to:

register, with a second device associated with a core execution environment, one or more data processing applications that are executable via a first execution environment that is associated with the first device, wherein the registration of the one or more data processing applications includes indicating intended uses associated with respective data processing applications from the one or more data processing applications, and wherein the second device determines to register the one or more data processing applications based on comparing the intended uses to one or more stored permitted uses or one or more prohibited uses associated with a data provider;

obtain, via a second execution environment, data associated with the data provider, wherein the second execution environment is associated with the data provider;

execute, via the first execution environment, a data processing application, from the one or more data processing applications, to process the data; and transmit, to the second device associated with the core execution environment, an indication of data usage based on the execution of the data processing application, wherein the indication of the data usage includes an indication of the data and the data processing application.

15. The non-transitory computer-readable medium of claim 14, wherein the one or more instructions, when executed by the one or more processors, further cause the first device to:

refrain from accessing the data outside of the first execution environment.

16. The non-transitory computer-readable medium of claim 14, wherein the one or more instructions, when executed by the one or more processors, further cause the first device to:

refrain from executing, in the first execution environment, any data processing applications that have not been registered with the second device associated with a core execution environment.

17. The non-transitory computer-readable medium of claim 14, wherein the one or more instructions, when executed by the one or more processors, further cause the first device to:

obtain, via the second device or the second execution environment, an indication of permissions associated with respective sets of data, including the data, provided by the data provider.

18. The non-transitory computer-readable medium of claim 17, wherein the one or more instructions, that cause the first device to execute the data processing application, cause the first device to:

execute the data processing application based on an intended use of the data processing application being permitted by a permission, from the permissions, associated with the data.

* * * * *